Oct. 29, 1968  R. REEBER ETAL  3,407,704
MILLING MACHINE

Filed Dec. 14, 1965  2 Sheets-Sheet 2

United States Patent Office 3,407,704
Patented Oct. 29, 1968

3,407,704
MILLING MACHINE
Rudolf Reeber, Neukeferloh, and Johann Müller, Munich, Germany, assignors to Friedrich Deckel Prazisions Mechanik und Maschinenbau, Munich, Germany, a firm of Germany
Filed Dec. 14, 1965, Ser. No. 513,733
Claims priority, application Germany, Dec. 18, 1964, D 46,092
3 Claims. (Cl. 90—17)

ABSTRACT OF THE DISCLOSURE

A milling machine has a spindle head which may be swiveled about a horizontal axis, and which carries a double-ended tool spindle rotatable on an axis perpendicular to the swivel axis. The spindle head is asymmetrical with respect to the swivel axis, the spindle-supporting portion of the head adjacent one end of the tool spindle being substantially farther from the swivel axis than the portion adjacent the opposite end of the tool spindle. This facilitates the use of a relatively short tool at the first mentioned end of the tool spindle and a relatively long tool at the opposite end of the tool spindle, with minimum readjustment of the work table when the spindle head is swiveled to bring first one tool and then the other into cooperative relation to the work.

---

This invention relates to a milling machine, and more particularly to a milling machine of the type having a swiveling spindle head.

An object of the invention is the provision of a generally improved and more satisfactory milling machine of this kind.

Another object is the provision of a milling machine having an improved form of swiveling head.

Still another object is the provision of a swiveling head of the kind in which tools of different lengths may be inserted in opposite ends of the spindle, the head being so designed that the operating part of a tool held in one end of the spindle is at approximately the same distance from the axis of swiveling of the spindle head as the operating part of a tool mounted in the other end of the spindle, so that when the spindle head is turned or swiveled on its axis, to bring the second tool into cooperative relation to the work, the tool will be in approximately or roughly the same relation to the work as the first tool, thereby avoiding to a great extent the repositioning of the work which has been necessary with many prior constructions.

Figure 1:
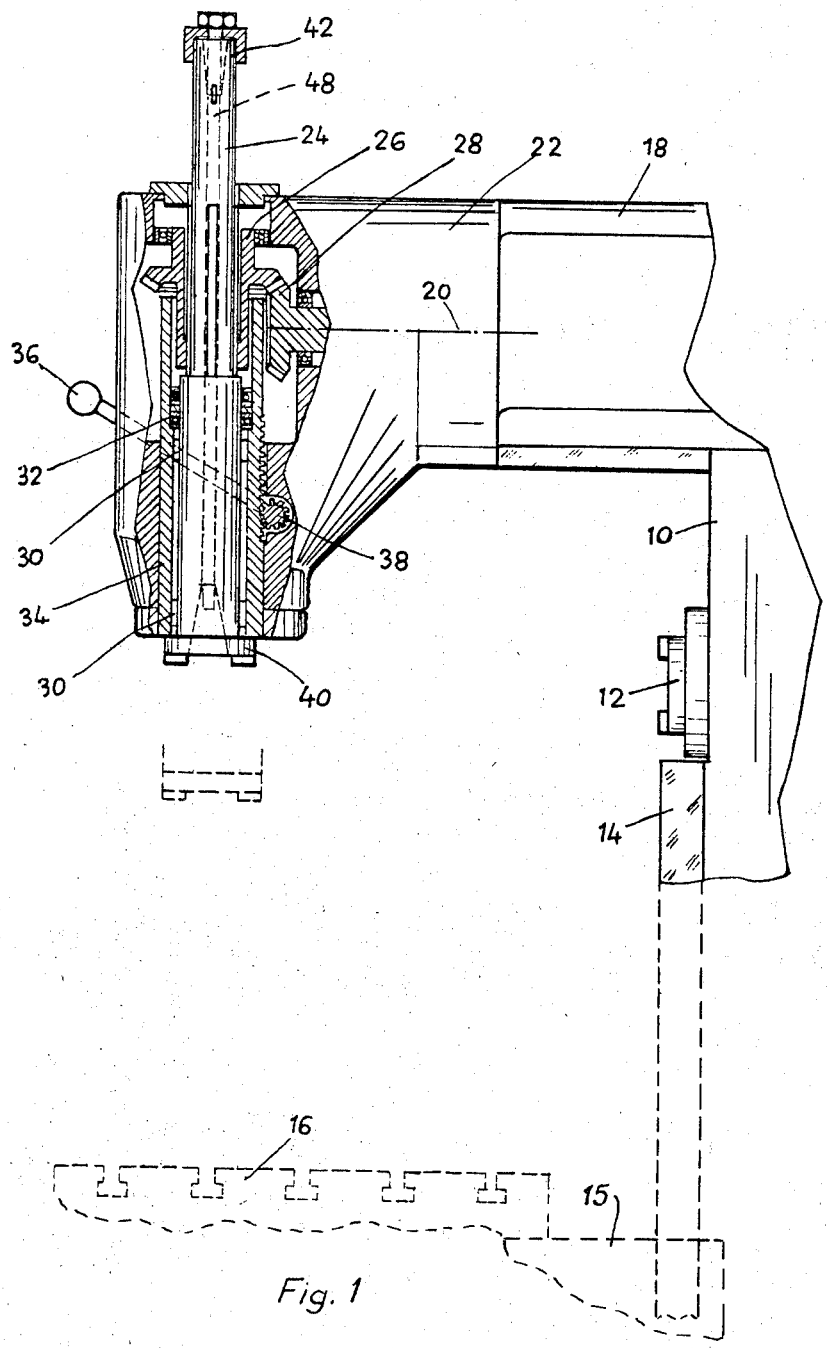
Figure 2:
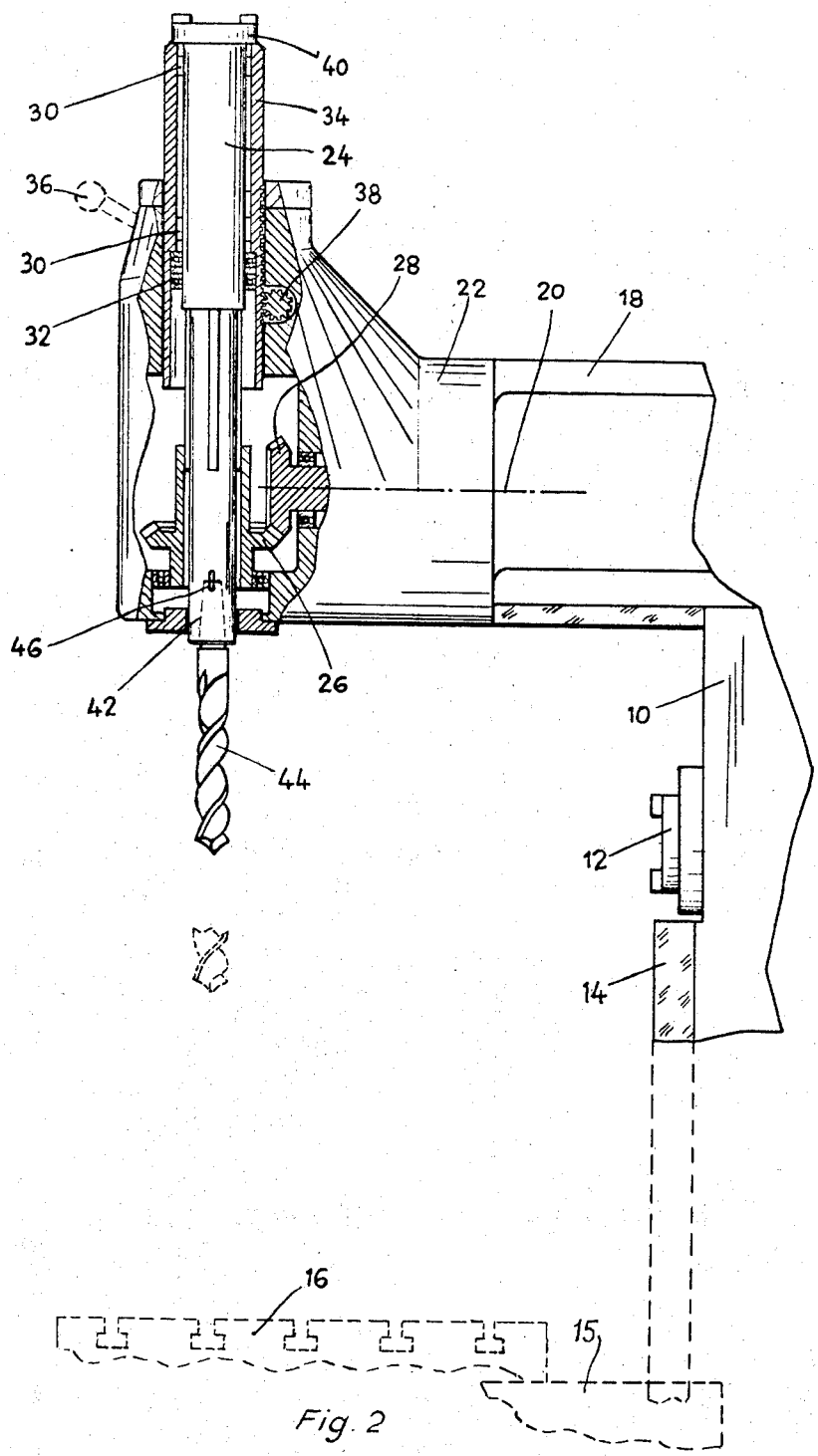

These and other desirable objects may be attained in the manner disclosed as an illustrative embodiment of the invention in the following description and in the accompanying drawings forming a part hereof, in which:

FIG. 1 is a fragmentary side elevation of a milling machine in accordance with a preferred embodiment of the present invention, with parts broken away and parts in vertical section, showing the relationship of the spindle to the work table when the spindle head is in one of its positions; and FIG. 2 is a similar view with the spindle head turned through 180 degrees from the position shown in FIG. 1, again showing the relationship of the spindle to the work table, when the head has been turned to position a tool in the second end of the spindle for operation on the work.

Except for the construction of the spindle head, as further described below, the rest of the milling machine may be of conventional construction well known in the art. It includes, for example, the usual machine bed or base (not shown) from which rises a column indicated in general at 10. The column may carry a horizontal tool spindle, the front end of which is shown at 12, which spindle may be rotatably mounted in a rigid part of the column 10, or may be mounted in a spindle stock which is adjustable horizontally on the column 10, both forms of construction being in the art.

Suitably supported for vertical adjusting movement is a work table 16, arranged in front of the column 10. The manner in which the work table is supported is immaterial so far as the present invention is concerned, and may be widely varied within the skill of the art. Merely as one convenient example of supporting the work table, there is shown a vertical guideway 14 on the front vertical face of the column 10, along which a knee 15 is vertically adjustable, the knee in turn supporting the work table 16. As plainly seen in the drawings, the work table preferably has the usual conventional undercut T-shaped slots, by means of which the workpiece to be operated upon may be securely clamped to the surface of the table.

At the top of the column 10 there is a horizontally displaceable spindle stock 18 for carrying the so-called vertical spindle. In those cases where the tool spindle 12 is mounted in a fixed part of the column 10, the guideway for horizontal movement of the spindle stock 18 will be formed on the top of the column 10. In those cases where the first spindle 12 is mounted in its own adjustable spindle stock, the spindle stock 18 will move along guideways formed on the top of the first spindle stock. Both arrangements are well known in the art, and the present invention is not concerned with which arrangement is used. In either event, the spindle stock 18 carries, at its front end, a spindle head 22 which can be swiveled or swung around a horizontal axis indicated at 20. The swivel axis 20 extends longitudinally through the spindle stock 18 approximately centrally thereof. The spindle head can be clamped fast in any desired position of swing, in the conventional manner well understood and not shown in the drawing.

This spindle head 22 carries a double-ended tool spindle 24 driven by means of a bevel gear 26 with which it is connected in an axially displaceable manner by means of a slot and feather, or other suitable known form of longitudinally slidable non-rotatable connection. The bevel gear 26 meshes with and is driven by another bevel gear 28 at the front end of a shaft which is coaxial with the axis of rotation 20 and which extends rearwardly into the spindle stock 18, being driven by any suitable conventional driving means within or attached to the spindle stock 18. The spindle 24 is supported by means of needle bearings 30 and thrust bearings 32 in a sleeve or quill 34 which can be displaced axially within the spindle head 22 by means of a hand lever 36 and a connected pinion 38 which meshes with rack teeth on the sleeve 34.

As already mentioned, the spindle 24 is what may be described as a double-ended spindle, having two spindle noses 40 and 42, each developed in a manner to receive tools. The nose 42 has a Morse taper in which a suitable tool may be inserted such as the drill 44 shown in FIG. 2. A transverse slot 46 is intended for the insertion of an ejector to eject the shank of the drill from the taper. The other spindle nose 40 is provided with a steep-angled taper in which milling tools can be fastened by means of a draw rod 48 adapted to be inserted longitudinally through the spindle. The draw rod is removed, of course, when a drill or other tool is mounted in the tapered socket in the nose 42.

One of the main features of the invention is the asymmetrical construction of the spindle head 22, so that the end of the spindle head which is adjacent to the spindle nose 42 is closer to the swiveling axis 20 than the opposite end of the spindle head which is adjacent to the spindle nose 40. The tools which would ordinarily be inserted in the end 42 of the spindle, such as a drill, are normally longer than the tools which are ordinarily inserted in the end 40 of the spindle, such as a milling cutter, an end mill, or a facing head. If the spindle head is of conventional construction, symmetrical with respect to the rotary axis or swiveling axis 20, it is necessary to readjust the height of the work table 16 to a considerable extent, when shifting from the use of a long tool to the use of a short tool, or vice versa. But with the present construction, the extent or degree of asymmetry is approximately equal to the difference in length of typical long tools and short tools adapted to be used in the spindle. Thus when a short tool, such as a conventional end mill, is mounted in the nose 40 of the spindle, and the spindle head is turned to the position shown in FIG. 1, the lower end of the tool will be at approximately the same elevation, and the same distance from the work table 16 and the work clamped thereon, as the lower end of a long tool such as the drill 44, mounted in the other end 42 of the spindle when the spindle head 22 is swiveled through 180 degrees from the position shown in FIG. 1 to the position shown in FIG. 2. This minimizes the need for readjusting the height of the work table 16, when working alternately with different tools in opposite ends of the spindle.

In either case there is, of course, a range of vertical feeding movement of the spindle, under the influence of the hand lever 36. This range of feeding movement is indicated by comparing the full line position and the dotted line position of the end 40 of the spindle, in FIG. 1, and by comparing the full line position and the dotted line position of the drill 44 in FIG. 2. This range of movement, plus the asymmetrical mounting of the spindle with respect to the swiveling axis 20, is usually sufficient to enable the work to proceed with no readjustment or very little readjustment of the elevation of the work table 16, when shifting from the use of a short tool in the end 40 of the spindle to the use of a long tool in the end 42 of the spindle, or vice versa. Thus the present invention saves time and effort on the part of the operator, and makes the milling machine more efficient and convenient to use.

Preferably the spindle head 22 is so shaped that the portion of the spindle head in the vicinity of the long-tool nose 42 is approximately a smooth continuation of the outline of the forward end of the spindle stock 18, as seen for example at the top of FIG. 1. However, the portion of the spindle head in the vicinity of the short-tool nose 40 is offset or projects to a substantial extent beyond the outline of the forward end of the spindle stock 18, as seen for example at the top of FIG. 2.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A milling machine comprising a spindle head mounted at one end of a spindle stock for swiveling movement about an axis of swivel extending longitudinally through said spindle stock approximately centrally thereof, and a double ended tool spindle rotatably mounted in said head, the nose at one end of the spindle being adapted to receive relatively long tools and the nose at the other end of the spindle being adapted to receive relatively short tools, characterized by the fact that said spindle head is formed asymmetrically with respect to said axis of swivel, to locate the nose for receiving short tools at a greater distance from said axis of swivel than the nose for receiving long tools, and by the fact that the portion of said spindle head in the vicinity of the long-tool nose of said spindle is approximately a smooth continuation of the outline of said end of said spindle stock and the portion of said spindle head in the vicinity of the short-tool nose of said spindle projects to a substantial extent beyond the outline of said end of said spindle stock.

2. A construction as defined in claim 1, wherein said spindle head includes an axially displaceable sleeve in which said tool spindle is rotatably mounted.

3. A construction as defined in claim 2, in which said displaceable sleeve is displaceable in a direction perpendicular to said axis of swivel.

References Cited

UNITED STATES PATENTS

| 1,004,620 | 10/1911 | Berold | 90—17 |
| 2,116,122 | 5/1938 | Ocenasek | 90—17 XR |
| 2,183,166 | 12/1939 | Palumbo | 90—17 |

FOREIGN PATENTS

| 1,008,749 | 11/1965 | Great Britain. |

LEONIDAS VLACHOS, *Primary Examiner.*